US007987065B1

(12) United States Patent
de Waal et al.

(10) Patent No.: US 7,987,065 B1
(45) Date of Patent: Jul. 26, 2011

(54) AUTOMATIC QUALITY TESTING OF MULTIMEDIA RENDERING BY SOFTWARE DRIVERS

(75) Inventors: Abraham B. de Waal, San Jose, CA (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 789 days.

(21) Appl. No.: 11/736,186

(22) Filed: Apr. 17, 2007

(51) Int. Cl.
*G01R 31/319* (2006.01)
(52) U.S. Cl. ......... 702/119; 702/118; 702/122; 702/183
(58) Field of Classification Search ............ 702/19, 702/27, 57, 63, 65, 69, 79, 81, 183, 188; 370/429; 709/230; 710/307, 309; 713/164
See application file for complete search history.

(56) References Cited

U.S. PATENT DOCUMENTS

| | | | |
|---|---|---|---|
| 5,450,557 A | 9/1995 | Kopp et al. | |
| 5,646,544 A | 7/1997 | Iadanza | |
| 5,737,631 A | 4/1998 | Trimberger | |
| 5,828,858 A | 10/1998 | Athanas et al. | |
| 5,889,816 A | 3/1999 | Agrawal et al. | |
| 5,892,961 A | 4/1999 | Trimberger | |
| 5,907,580 A | 5/1999 | Cummings | |
| 5,909,559 A * | 6/1999 | So ............................... | 710/307 |
| 5,910,733 A | 6/1999 | Bertolet et al. | |
| 5,943,242 A | 8/1999 | Vorbach et al. | |
| 5,959,881 A | 9/1999 | Trimberger et al. | |
| 5,963,048 A | 10/1999 | Harrison et al. | |
| 5,966,534 A | 10/1999 | Cooke et al. | |
| 5,970,254 A | 10/1999 | Cooke et al. | |
| 6,021,490 A | 2/2000 | Vorbach et al. | |
| 6,023,742 A | 2/2000 | Ebeling et al. | |
| 6,081,903 A | 6/2000 | Vorbach et al. | |
| 6,088,043 A | 7/2000 | Kelleher et al. | |
| 6,094,065 A | 7/2000 | Tavana et al. | |
| 6,119,181 A | 9/2000 | Vorbach et al. | |
| 6,120,551 A | 9/2000 | Law et al. | |
| 6,150,838 A | 11/2000 | Wittig et al. | |
| 6,230,307 B1 | 5/2001 | Davis et al. | |
| 6,237,029 B1 | 5/2001 | Master et al. | |
| 6,266,760 B1 | 7/2001 | DeHon et al. | |
| 6,282,627 B1 | 8/2001 | Wong et al. | |
| 6,338,106 B1 | 1/2002 | Vorbach et al. | |
| 6,353,841 B1 | 3/2002 | Marshall et al. | |
| 6,405,299 B1 | 6/2002 | Vorbach et al. | |
| 6,408,039 B1 | 6/2002 | Ito | |
| 6,425,068 B1 | 7/2002 | Vorbach et al. | |
| 6,433,578 B1 | 8/2002 | Wasson | |
| 6,480,937 B1 | 11/2002 | Vorbach et al. | |
| 6,542,998 B1 | 4/2003 | Vorbach et al. | |
| 6,571,381 B1 | 5/2003 | Vorbach et al. | |
| 6,678,734 B1 * | 1/2004 | Haatainen et al. ............ | 709/230 |

(Continued)

*Primary Examiner* — Michael P Nghiem
*Assistant Examiner* — Felix E Suarez
(74) *Attorney, Agent, or Firm* — Patterson & Sheridan, LLP (57) ABSTRACT

A method and system for automatically verifying the quality of multimedia rendering are disclosed. Specifically, one embodiment of the present invention sets forth a method, which includes the steps of directing a command intended for a first driver to both the first driver and a second driver in parallel as the multimedia application issues the command and in response to a condition indicative of having available data to compare, comparing a first output generated by a first processing unit associated with the first driver and a second output generated by a second processing unit associated with the second driver.

20 Claims, 7 Drawing Sheets

U.S. PATENT DOCUMENTS

| | | |
|---|---|---|
| 6,697,979 B1 | 2/2004 | Vorbach et al. |
| 7,003,660 B2 | 2/2006 | Vorbach et al. |
| 7,210,129 B2 | 4/2007 | May et al. |
| 7,266,725 B2 | 9/2007 | Vorbach et al. |
| 7,362,772 B1 * | 4/2008 | Alfieri et al. .................. 370/429 |
| 7,394,284 B2 | 7/2008 | Vorbach |
| 7,434,191 B2 | 10/2008 | Vorbach et al. |
| 7,444,531 B2 | 10/2008 | Vorbach et al. |
| 7,584,353 B2 * | 9/2009 | Risan et al. .................. 713/164 |

* cited by examiner

AUTOMATIC QUALITY TESTING OF MULTIMEDIA RENDERING BY SOFTWARE DRIVERS

BACKGROUND OF THE INVENTION

1. Field of the Invention

Embodiments of the present invention relate generally to quality assurance techniques and more specifically to a method and system for automatically verifying the quality of multimedia rendering.

2. Description of the Related Art

Unless otherwise indicated herein, the approaches described in this section are not prior art to the claims in this application and are not admitted to be prior art by inclusion in this section.

Figure 1A:
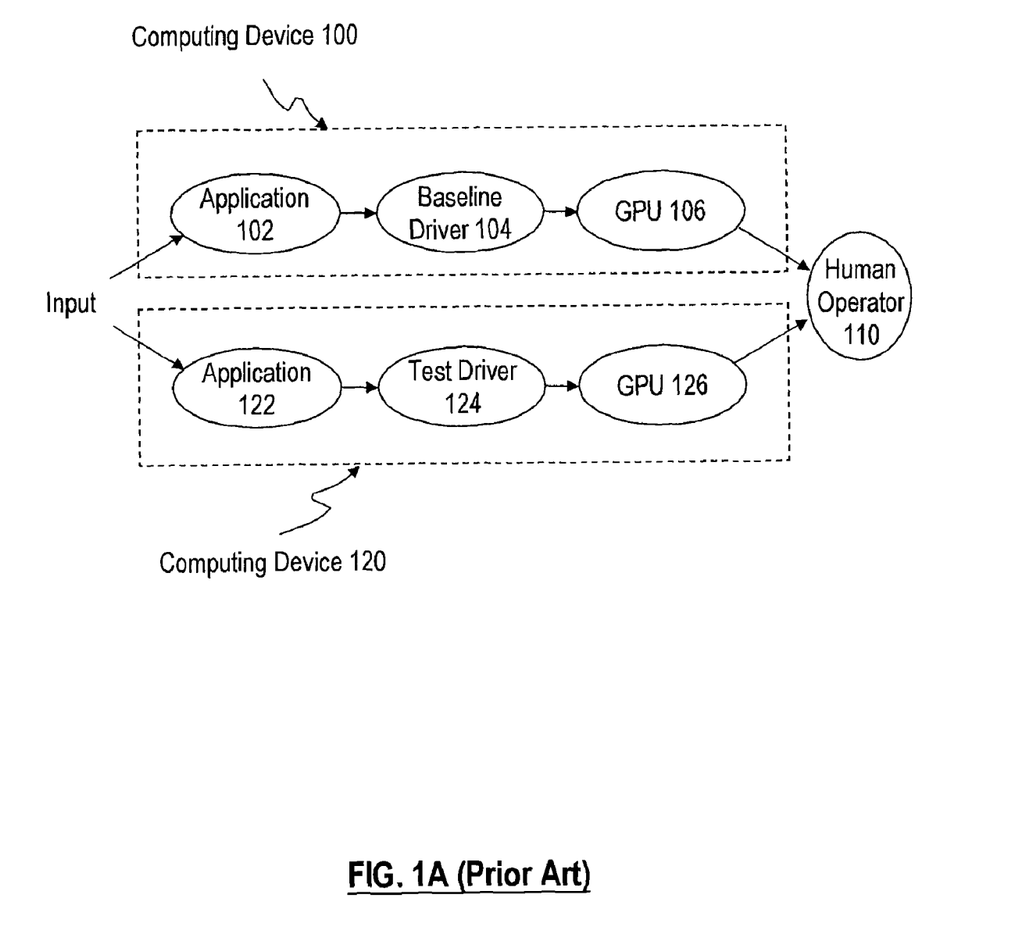
FIG. 1A is a simplified diagram of a conventional verification process requiring the visual inspection of a human operator.

The robustness of a multimedia system depends in part on how rigorously and extensively the system is tested. However, as the multimedia system and the applications running on the system become increasingly complex, verifying these complex system and applications in a comprehensive and yet timely manner becomes more and more challenging. To illustrate, FIG. 1A is a simplified diagram of a conventional verification process for a graphics system. In this process, a human operator 110 visually inspects the image outputs of a computing device 100 and a computing device 102 to try to detect any image corruption. The hardware of this verification process is kept constant, so that the graphics processing unit ("GPU") 106 and the GPU 126 are the same. Some of the software components, such as the application 102 and the application 122, are also kept constant, but the other components, such as the baseline driver 104 and the test driver 124 are varied. Because of the reliance placed on the human operator 110, this process may be slow in delivering verification results, and the verification results are prone to human errors.

Figure 1B:
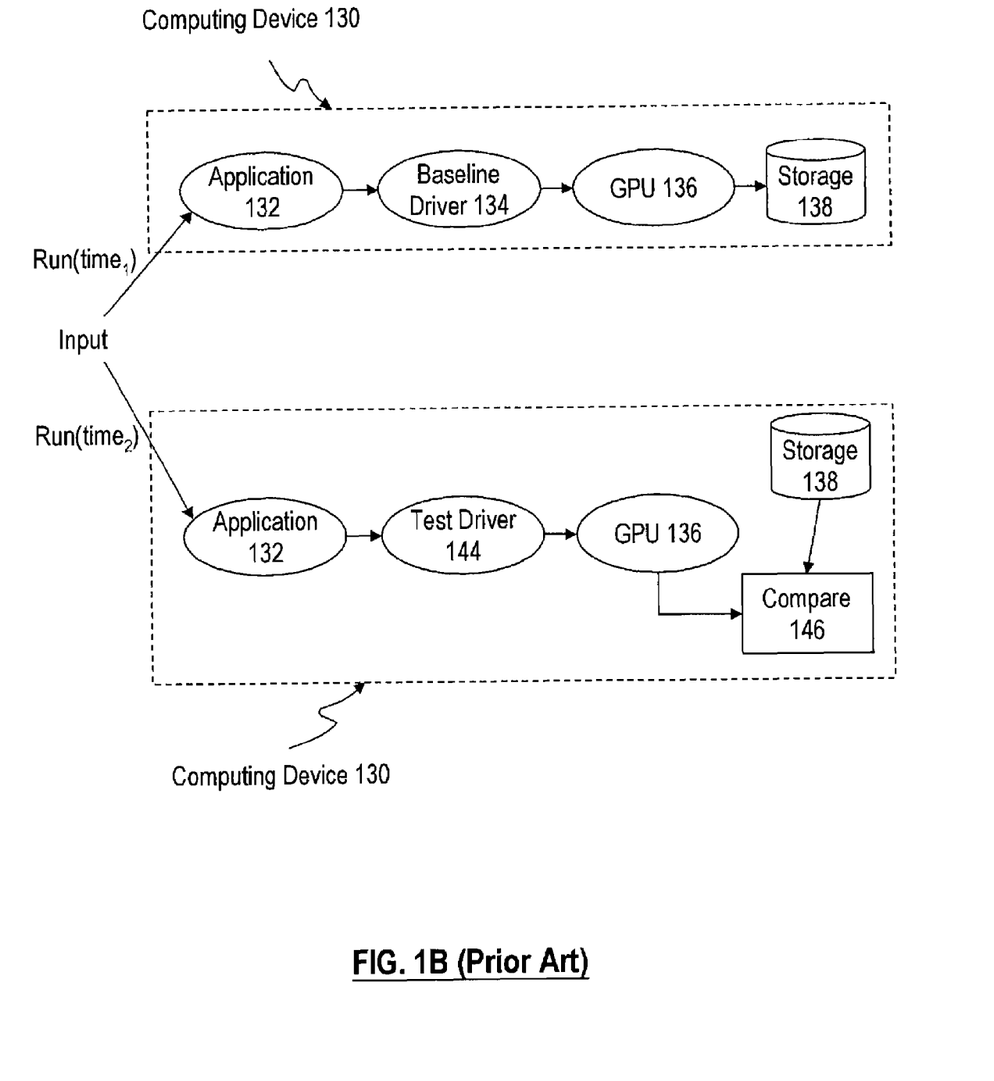
FIG. 1B is a simplified diagram of a conventional automated verification process.

Although some prior art attempts have been made to automate the verification process discussed above, such efforts still fall short, especially for handling highly interactive multimedia applications, such as games. FIG. 1B is a simplified diagram illustrating a conventional automated verification process for a graphics system. Here, the process involves a single computing device 130 running two sets of testing procedures at two different points in time, namely, $time_1$ and $time_2$, without any intervention of a human operator. The first run of testing, denoted as run ($time_1$), involves a baseline driver 134, and the second run of testing, denoted as run ($time_2$), involves a test driver 144. The computing device 130 first stores the verification results from run ($time_1$) in a storage device 138 and then retrieves the stored data to compare with the results from run ($time_2$) in a comparison operation 146. Unlike the process shown in FIG. 1A, either the GPU 136 or another processing unit (not shown in FIG. 1A) in the computing device 130 performs the comparison operation 146.

Despite the automation, there are still several drawbacks associated with this verification process. One, due to the limited capacity of the storage device 138, only a limited amount of verification results generated by the process can be stored and retrieved for comparison. Consequently, instead of verifying an entire graphics application, only a few representative frames of data from the graphics application are tested. This lack of extensive testing of the graphics application renders the application less stable. Two, the automated verification process is unable to conduct multiple test runs, such as run ($time_1$) and run ($time_2$), under identical testing conditions and potentially leading to meaningless verifications results. For instance, suppose a newly developed test driver 144 is to be tested against the baseline driver 134 on how a ball 152 bounces along a path 154 in a display screen 150 shown in FIG. 1C. Suppose further that the bouncing pattern of the ball 152 is generated according to a time-based model. So, even if the path 154 stays constant in run ($time_1$) and run ($time_2$), any change in the testing conditions between the two runs may result in displaying the ball 152 at a position 156 in a particular frame in run ($time_1$) and displaying the ball 152 at a completely different position, such as a position 158, in the same frame in run ($time_2$). As has been demonstrated, performing the comparison operation 146 on the aforementioned two frames from the two test runs yields little to no useful information.

Figure 1C:
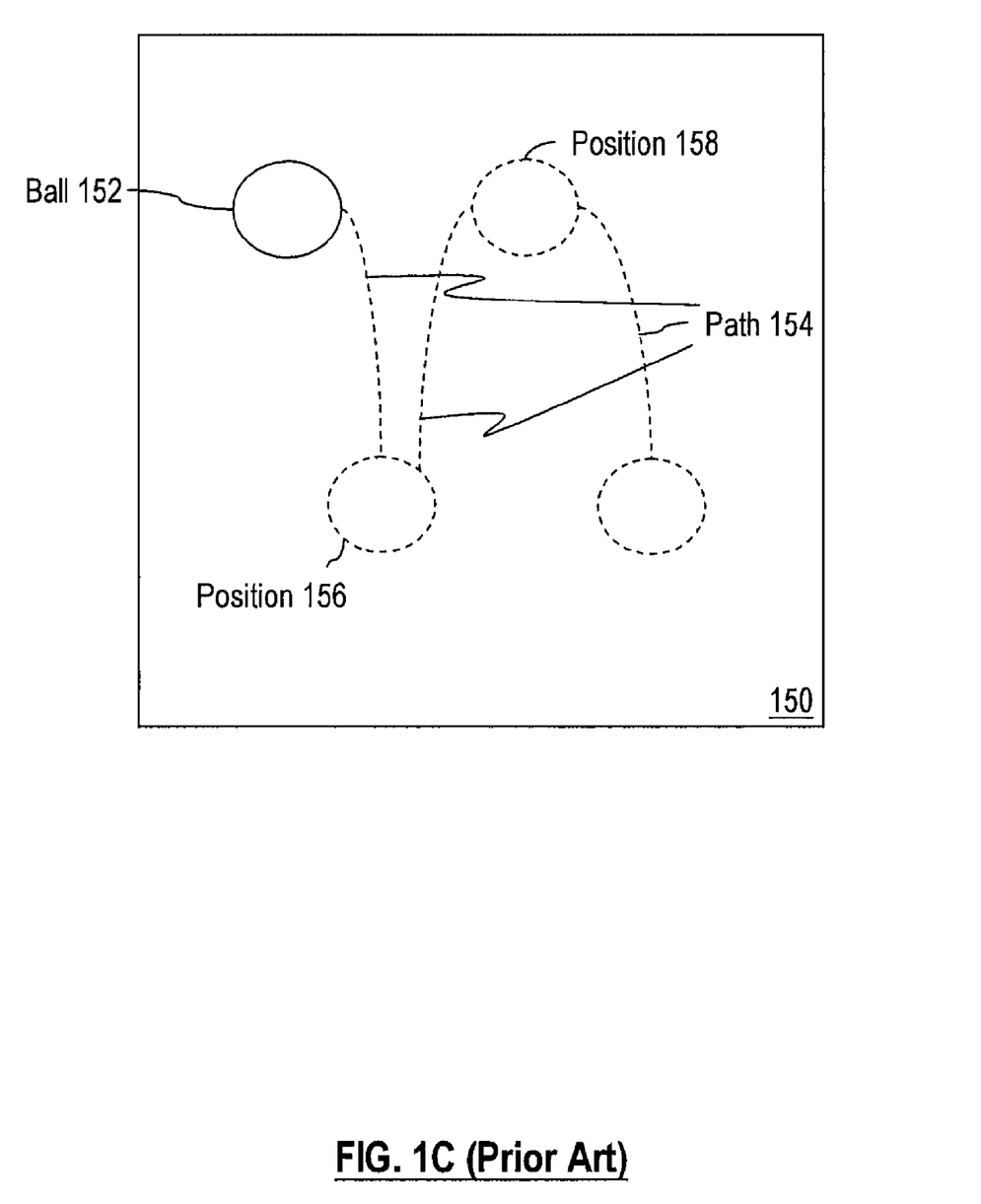
FIG. 1C is a screen shot illustrating some possible effects of altering the testing conditions from one test run to another.

Moreover, even if the testing conditions can be kept constant between test runs, the test runs can still generate completely unrelated output data. For example, suppose the test driver 144 is to be tested against the baseline driver 134 on displaying the explosion of the ball 152 in the display screen 150. If the debris pieces from the explosion are designed to be randomly generated, then having the same set of pieces in run ($time_1$) and run ($time_2$) to compare is nearly impossible and again leading to potentially meaningless verification results.

As the foregoing illustrates, what is needed in the art is a verification process that is capable of extensively and efficiently verifying data generated by multimedia applications and addressing at least the shortcomings of the prior art approaches set forth above.

SUMMARY OF THE INVENTION

A method and system for automatically verifying the quality of multimedia rendering are disclosed. Specifically, one embodiment of the present invention sets forth a method, which includes the steps of directing a command intended for a first driver to both the first driver and a second driver in parallel as the multimedia application issues the command and in response to a condition indicative of having available data to compare, comparing a first output generated by a first processing unit associated with the first driver and a second output generated by a second processing unit associated with the second driver.

One advantage of the disclosed method and system is that multiple test runs can be conducted in parallel, in a single pass, and under a set of deterministic testing conditions so that test results can be obtained efficiently and quickly.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, "kernel mode" software broadly refers to software having access to operating system structures, all system memory, and all processor instructions. One kernel mode component also implicitly trusts another kernel mode component. On the other hand, "user mode" software only has access to user space and needs to make system calls to the kernel to access privileged instructions or data. To safeguard system security, kernel mode software needs to validate data and addresses from user mode software. Also, an operation is said to be performed "in parallel" with another operation, when at least some portions of the two operations are performed at the same time. One embodiment of the present invention is implemented as a software component for use with a computer system. The software component defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention.

Figure 2:
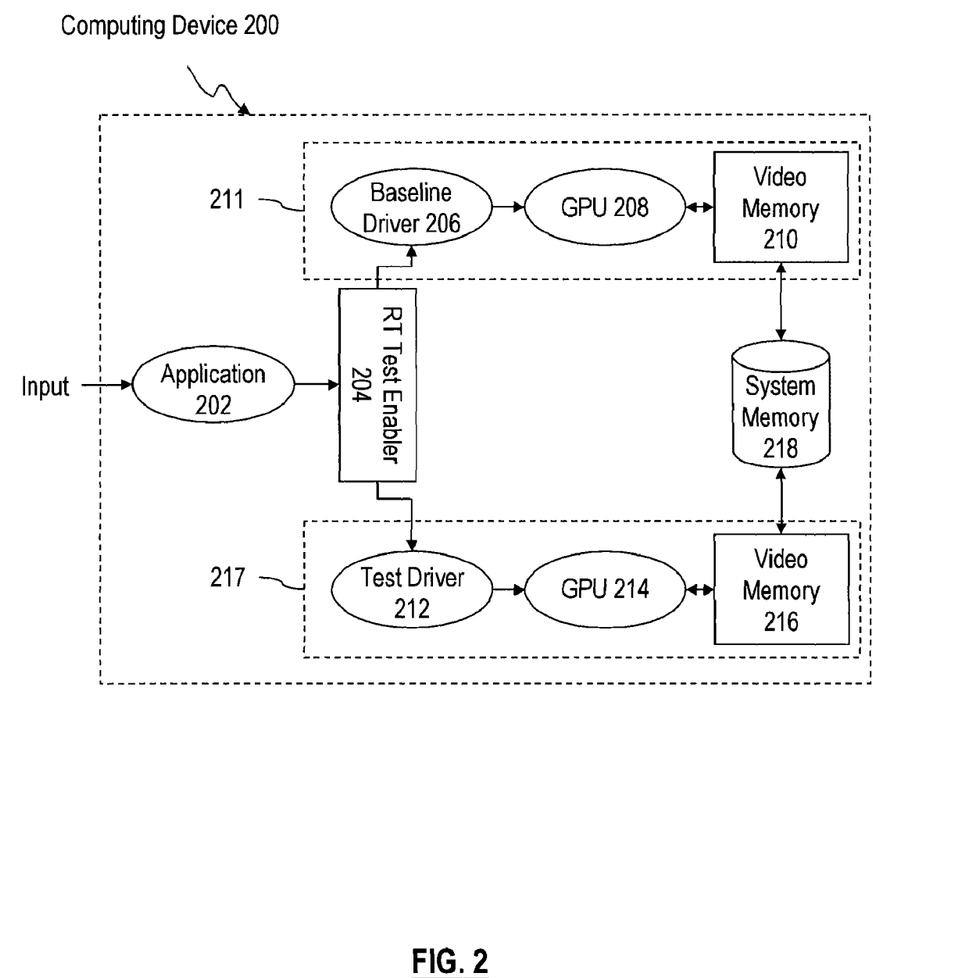
FIG. 2 is a simplified block diagram of a computing device configured to verify data from a multimedia application, according to one embodiment of the present invention.

FIG. 2 is a simplified block diagram of a computing device, 200, configured to verify data from a multimedia application, according to one embodiment of the present invention. Here, the application 202 is a graphics-intensive application that interacts with two graphics systems, namely, a graphics subsystem 211 and a graphics subsystem 217. The graphics subsystem 211 includes a baseline driver 206, a GPU 208, and video memory 210, and the graphics subsystem 217 includes a test driver 212, a GPU 214, and video memory 216. In one implementation, the application 202 is not aware of the existence of the graphics subsystem 217 and typically issues a stream of commands intended for the baseline driver 206 to configure the GPU 208 to process image data. The GPU 208 then stores the processed data in video memory 210 before scanning out the data to a display device. To verify a test driver 212 against the baseline driver 206 under a deterministic set of testing conditions and in a single pass, the computing device 200 includes a real-time ("RT") test enabler 204 to direct the same stream of commands for the baseline driver 206 to also the test driver 212. Subsequent paragraphs will further detail the operations of the RT test enabler 204. To further minimize the number of variables in the verification process of the drivers, the hardware components of the graphics subsystems are kept constant in one implementation. In other words, the GPU 208 and the video memory 210 in the graphics subsystem 211 are made to be the same as the GPU 214 and the video memory 216 in the graphics subsystem 217.

Figure 3:
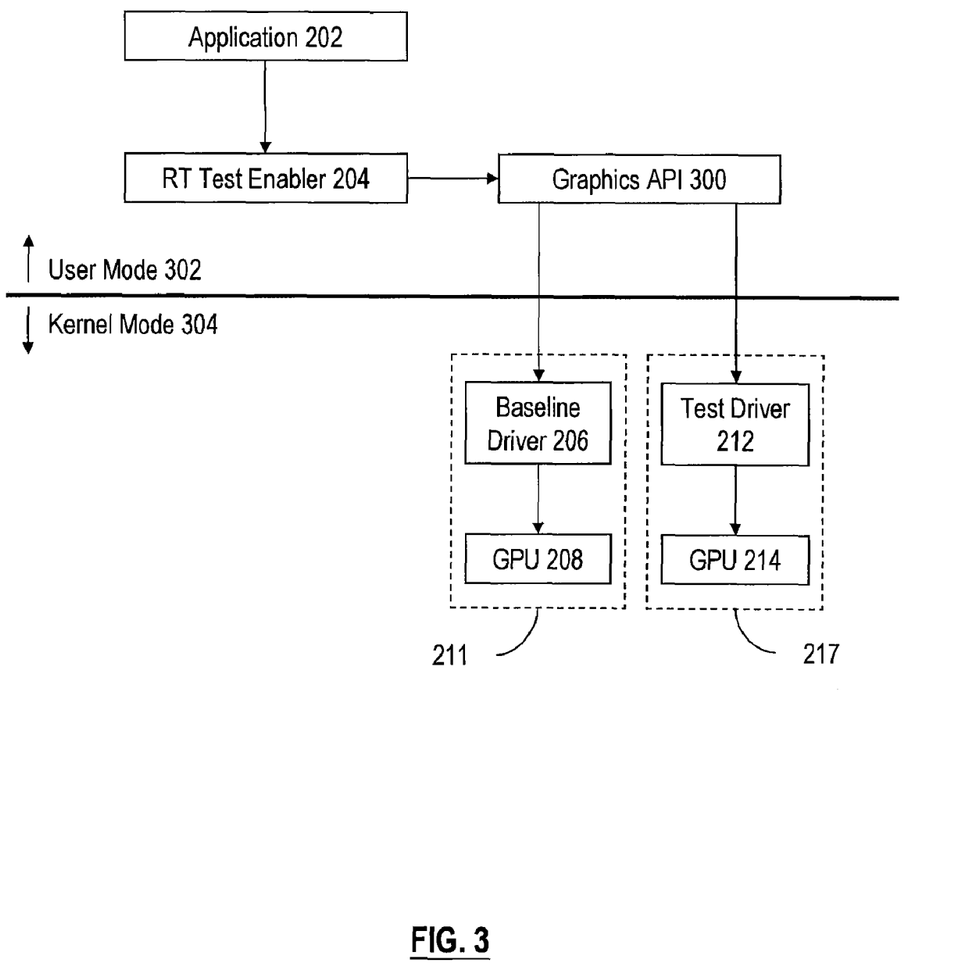
FIG. 3 is a simplified diagram of the driver infrastructure for a computing device, according to one embodiment of the present invention.

In one embodiment, the RT test enabler 204 is a runtime library, which the application 202 links with in the user mode of the operating system. The baseline driver 206 and the test driver 212 are both kernel mode drivers. FIG. 3 is a simplified diagram of the driver infrastructure for the computing device 200, according to one embodiment of the present invention. In particular, the RT test enabler 204 is designed to mimic a graphics Application Programming Interface ("API") 300, such as, without limitation, the Microsoft DirectX API. In one implementation, the RT test enabler 204 has the same file name and contains the same entry points as the graphics API 300. In addition, the RT test enabler 204 is placed in a particular file location (e.g., in the same file directory as the application 202) so that the application 202 links to it as opposed to linking to the graphics API 300.

Figure 4:
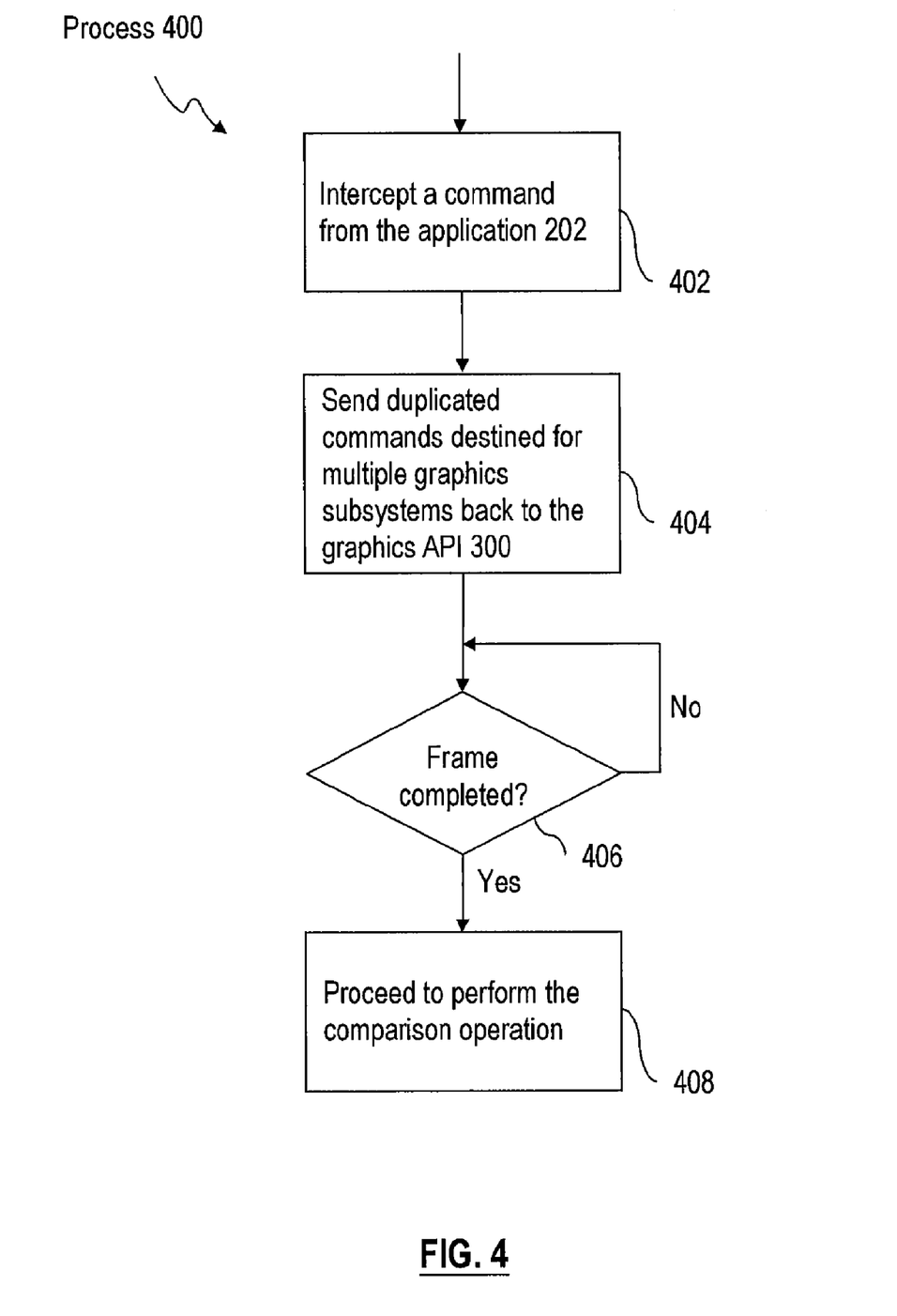
FIG. 4 is a flowchart illustrating method steps for configuring multiple graphics subsystems to conduct test runs in parallel and compare the results of the test runs, according to one embodiment of the present invention.

FIG. 4 is a flowchart illustrating method steps for configuring multiple graphics subsystems to conduct test runs in parallel and compare the results of the test runs, according to one embodiment of the present invention. Specifically, in a step 402 of a process 400, the RT test enabler 204 intercepts a command issued by the application 202, which is intended for the graphics API 300 as shown in FIG. 3. As mentioned above, because the application 202 is not aware of the graphics subsystem 217, the intercepted command is destined for only the known graphics subsystem 211. Then in a step 404, the RT test enabler 204 duplicates the intercepted command and sends the same command now destined for both the graphics subsystems 211 and the graphics subsystem 217 back to the graphics API 300. In one implementation, when the processing for a frame of data has been completed, the processed data is temporarily stored in the video memory of the two graphics subsystems. At this time, the application 202 sends special commands to further process the stored data. In other words, if the RT test enabler 204 intercepts any of these special commands in a step 406, then that signifies a frame of data is ready for comparison. In a step 408, the RT test enabler 204 proceeds to compare the data.

In one implementation, referring back to FIG. 2, the application 202 issues a special command, present, after it queries the frame buffers in the video memory 210 and video memory 216, retrieves the processed image data from the frame buffers, and places the retrieved data into two separate buffers in a system memory 218. In other words, by the time the RT test enabler 204 intercepts the present command in the step 406 shown in FIG. 4, not only has a frame of data been processed by the two graphics subsystems, but the two sets of processed data have also been stored in the system memory 218. To perform the comparison operation in the step 408, one implementation is for a processing unit other than the GPUs in the computing device 200 to execute the programming instructions for implementing the comparison functionality. In one implementation, the comparison instructions are a part of the programming instructions for the present command and are defined in the RT test enabler 204.

In an alternative implementation, the application 202 can issue other special commands, which through the RT test enabler 204, causing the GPU 214 to copy the processed data stored in the video memory 216 into the video memory 210 and then to trigger the GPU 208 to compare the two sets of processed data. Under this scenario, the comparison algorithm is likely written in a low level programming language, such as microcode, for the GPU 208 to execute. In one implementation, the software containing this comparison algorithm may be kernel mode software. The GPU 208 is also responsible for passing information related to the comparison results back to the user mode.

As has been demonstrated, the RT test enabler 204 enables the graphics subsystems 211 and 217 to receive and respond to the same set of commands in parallel and to conduct test runs under a deterministic set of testing conditions and in a single pass. In addition, since different drivers can be easily loaded onto the two graphics subsystems in the computing device 200 and can be tested against one another, regression analysis can be efficiently performed ensuring the rapid development of a new driver, according to one embodiment of the present invention. In one implementation, a previous version of a driver is considered a baseline driver, and a current version is considered a test driver.

Figure 5:
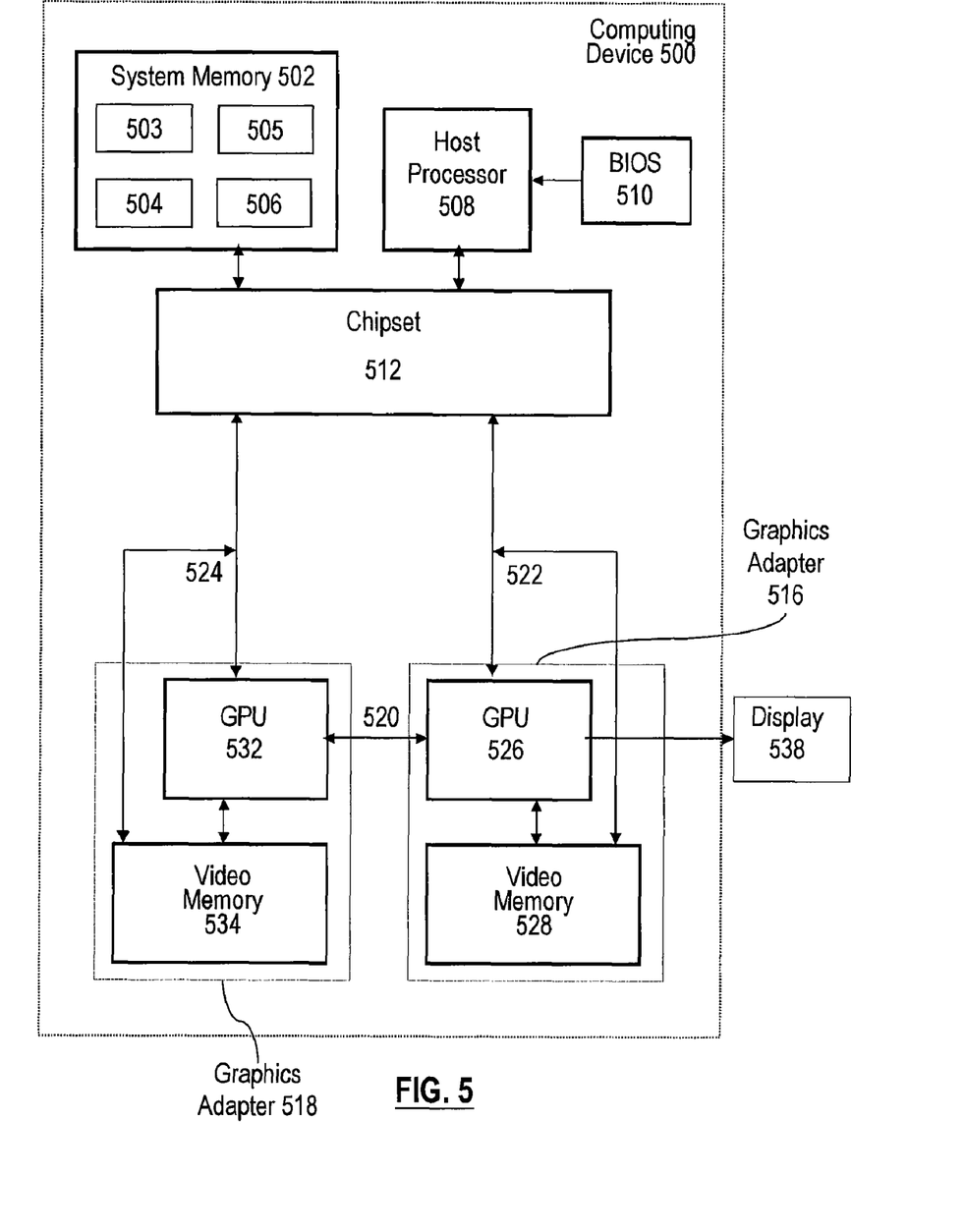
FIG. 5 is a simplified system diagram of a computing device, configured to implement one or more aspects of the present invention.

FIG. 5 is a simplified system diagram of a computing device, 500, configured to implement one or more aspects of the present invention. Without limitation, the computing device 500 may be a desktop computer, server, laptop computer, palm-sized computer, tablet computer, game console, cellular telephone, hand-held device, mobile device, computer based simulator, or the like. The computing device 500 includes a host processor 508, BIOS 510, system memory 502, and a chipset 512 that is directly coupled to a graphics adapter 516 with a GPU 526 and a graphics adapter 518 with a GPU 532. BIOS 510 is a program stored in read only memory ("ROM") or flash memory that is run at bootup.

Graphics drivers 503 and 504, stored within the system memory 502, configures GPU 526 and GPU 532, respectively, to take on the graphics processing workload performed by the computing device 500 and to communicate with applications that are executed by the host processor 508. In one embodiment, graphics drivers generate and place a stream of commands in a "push buffer," which is then transmitted to the GPUs. When the commands are executed, certain tasks, which are defined by the commands, are carried out by the GPUs. At run-time, libraries 505 and 506, corresponding to the RT test enabler 204 and the graphics API 300 shown in FIG. 3, are also loaded into the system memory 502. The graphics drivers 503 and 504 correspond to the baseline driver 206 and the test driver 212, and the GPUs 526 and 532 correspond to the GPUs 208 and 214 shown in FIG. 2.

In some embodiments of the computing device 500, the chipset 512 provides interfaces to the host processor 508, memory devices, storage devices, graphics devices, input/output ("I/O") devices, media playback devices, network devices, and the like. Some examples of the interfaces include, without limitation, Advanced Technology Attachment ("ATA") bus, Accelerated Graphics Port ("AGP"), Universal Serial Bus ("USB"), Peripheral Component Interface ("PCI"), and PCI-Express®. It should be apparent to a person skilled in the art to implement the chipset 512 in two or more discrete devices, each of which supporting a distinct set of interfaces. In yet other embodiments, the host processor 508, the GPUs, the chipset 512, or any combination thereof, may be integrated into a single processing unit. Further, the functionality of each or both of the GPUs 526 and 532 may be included in a chipset or in some other type of special purpose processing unit or co-processor.

Connections 522 and 524 support symmetric communication links, such as, without limitation, PCI-Express®. The connection 520 can be any technically feasible scalable bus that provides a direct connection between the GPU 526 and the GPU 532. In the computing device 500, this direct connection is between two physically distinct graphics adapters, or the graphics adapters 516 and 518; thus the connection is also referred to as an external video bridge. One embodiment of the connection 520 can be implemented using the NVIDIA® SLI™ multi-GPU technology.

As shown, the GPU 526 within the graphics adapter 516 is responsible for outputting image data to a display 538. The display 538 may include one or more display devices, such as, without limitation, a cathode ray tube ("CRT"), liquid crystal display ("LCD"), or the like. The GPU 526 is also coupled to video memory 528, which may be used to store image data and program instructions. The GPU 532 within the graphics adapter 518 is coupled to video memory 534, which may also be used to store image data and program instructions.

Although the above paragraphs mainly focus on conducting test runs in parallel to compare graphics drivers, it should be apparent to a person with ordinary skills in the art to apply the present invention to any multimedia drivers, such as audio drivers. Moreover, it should also be apparent to a person with ordinary skills in the art to conduct different types of test runs in the computing device 200 of FIG. 2 and yet still remain within the scope of the claimed invention. For instance, instead of verifying one graphics driver against another, these drivers are kept constant but one version of the GPU is compared with another, according to one embodiment of the present invention. Furthermore, if the tasks performed by one of the GPUs, for example, the GPU 208 in FIG. 2, can be performed by the a host processor, then the verification becomes comparing the output data generated by the GPU 214 with the output data generated by the host processor.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for verifying data from a multimedia application, the method comprising:
    directing a command issued by the multimedia application and intended for a first driver to the first driver executed by a unit;
    directing, in parallel, the command intended for the first driver to a second driver executed by a second processing unit;
    causing the first processing unit to execute the command to generate a first output;
    causing the second processing unit to execute the command to generate a second output; and
    in response to a condition indicative of having available data to compare, comparing the first output generated by the first processing unit associated with the first driver and the second output generated by the second processing unit associated with the second driver, wherein the first output is retrieved from a first local memory accessible by the first processing unit, and the second output is retrieved from a second local memory accessible by the second processing unit.

2. The method of claim 1, wherein the command is an application programming interface ("API") call to a first library.

3. The method of claim 2, further comprising:
    intercepting the command before the command reaches the first library; and
    duplicating the command.

4. The method of claim 1, further comprising copying the first output and the second output into a system memory before performing the comparing step.

5. The method of claim 4, further comprising comparing the first output and the second output in the user mode.

6. The method of claim 1, further comprising copying the second output into the first local memory before performing the comparing step.

7. The method of claim 6, further comprising:
comparing the first output and the second output in the kernel mode; and
sending the results from comparing the first output and the second output back to the user mode.

8. The method of claim 3, further comprising linking a second library with the multimedia application, wherein the second library includes identical entry points as the first library.

9. The method of claim 8, further comprising directing the duplicated command to the first library.

10. A non-transitory computer-readable medium containing a sequence of instructions, which when executed by a processing unit in a computing device, causes the processing unit to:
direct a command issued by the multimedia application and intended for a first driver to the first driver executed by a first processing unit;
direct, in parallel, the command intended for the first driver to a second driver executed by a second processing unit;
cause the first processing unit to execute the command to generate a first output;
cause the second processing unit to execute the command to generate a second output; and
in response to a condition indicative of having available data to compare, compare the first output generated by the first processing unit associated with the first driver and the second output generated by the second processing unit associated with the second driver, wherein the first output is retrieved from a first local memory accessible by the first processing unit, and the second output is retrieved from a second local memory accessible by the second processing unit.

11. The computer-readable medium of claim 10, wherein the command is an application programming interface ("API") call to a first library.

12. The computer-readable medium of claim 11, further containing a sequence of instructions, which when executed by the processing unit, causes the processing unit to:
intercept the command before the command reaches the first library; and
duplicate the command.

13. The computer-readable medium of claim 10, further containing a sequence of instructions, which when executed by the processing unit, causes the processing unit to copy the first output and the second output into a system memory before comparing the first output and the second output.

14. The computer-readable medium of claim 13, further containing a sequence of instructions, which when executed by the processing unit, causes the processing unit to comparing the first output and the second output in the user mode.

15. The computer-readable medium of claim 10, further containing a sequence of instructions, which when executed by the processing unit, causes the processing unit to copy the second output into the first local memory before comparing the first output and the second output.

16. The computer-readable medium of claim 15, further containing a sequence of instructions, which when executed by the first processing unit, causes the first processing unit to:
compare the first output and the second output in the kernel mode; and
send the results from comparing the first output and the second output back to the user mode.

17. The computer-readable medium of claim 12, further containing a sequence of instructions, which when executed by the processing unit, causes the processing unit to link a second library with the multimedia application, wherein the second library includes identical entry points as the first library.

18. The computer-readable medium of claim 17, further containing a sequence of instructions, which when executed by the processing unit, causes the processing unit to direct the duplicated command to the first library.

19. A computing device configured to verify data from a multimedia application, the computing device comprising:
a processing unit,
a system memory;
a first multimedia subsystem having a first processing unit that executes a first driver; and
a second multimedia subsystem having a second processing unit that executes a second driver,
wherein the processing unit is configured to:
direct a command issued by the multimedia application and intended for the first driver to the first driver executed by the first processing unit;
direct, in parallel, the command intended for the first driver to the second driver executed by the second processing unit;
cause the first processing unit to execute the command to generate a first output;
cause the second processing unit to execute the command to generate a second output; and
in response to a condition indicative of having available data to compare, compare the first output generated by the first processing unit and the second output generated by the second processing unit.

20. The computing device of claim 19, wherein the processing unit is further configured to:
intercept the command before the command reaches an intended library; and
duplicate the command.

* * * * *